F. T. ROBERTS.
APPARATUS FOR MAKING HOLLOW RUBBER ARTICLES.
APPLICATION FILED AUG. 5, 1918.

1,388,125.

Patented Aug. 16, 1921.
3 SHEETS—SHEET 1.

INVENTOR,
FRED THOMAS ROBERTS,
By Bates & Macklin,
ATT'YS

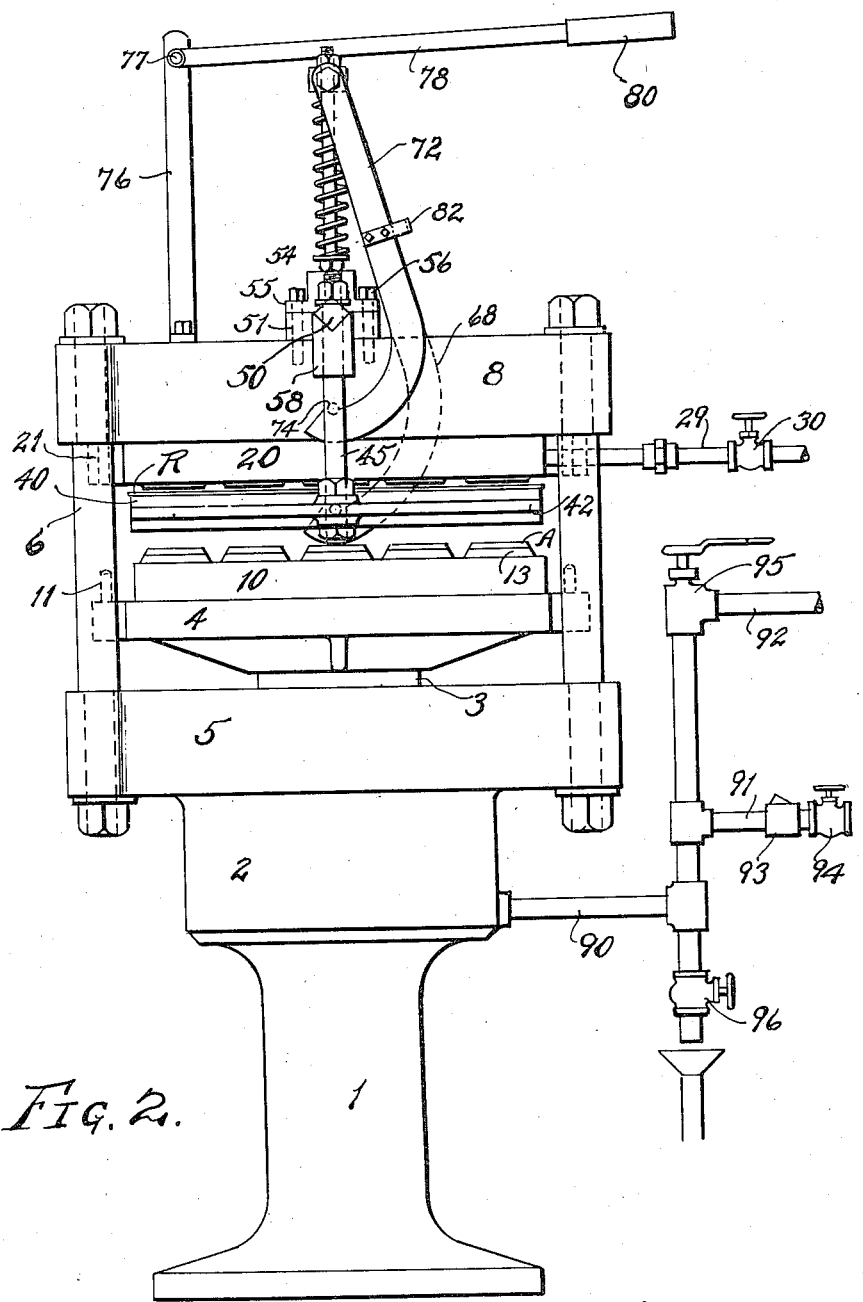

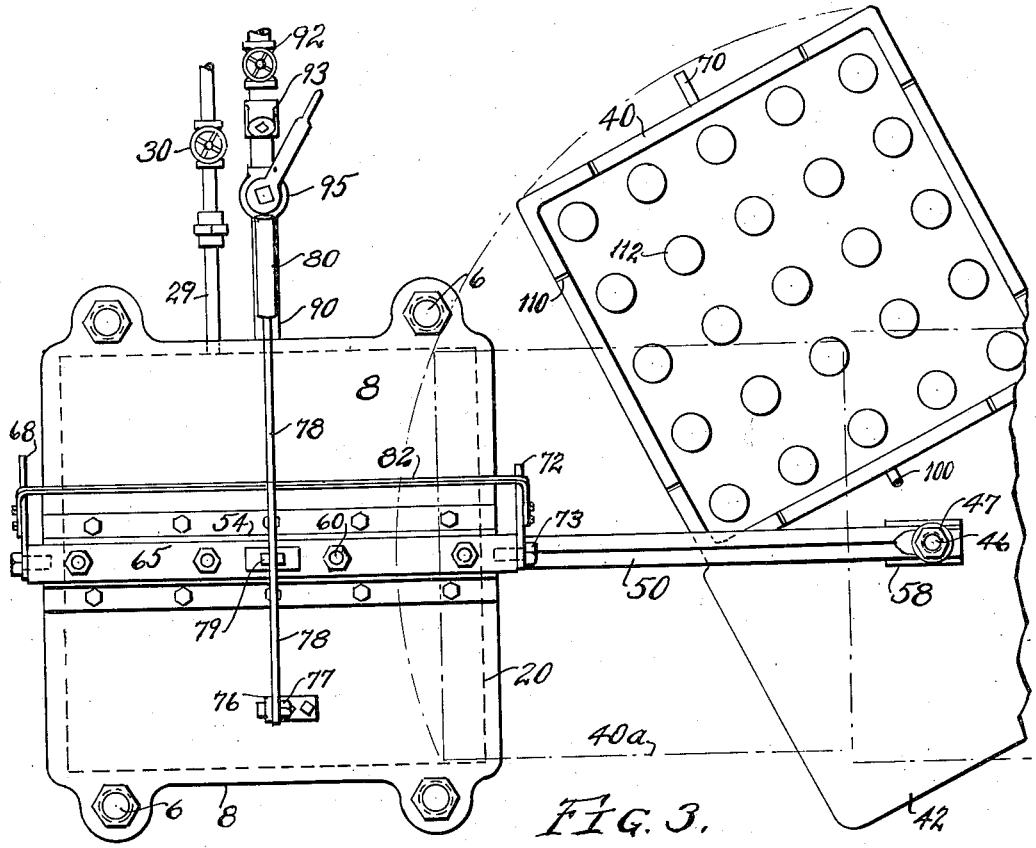
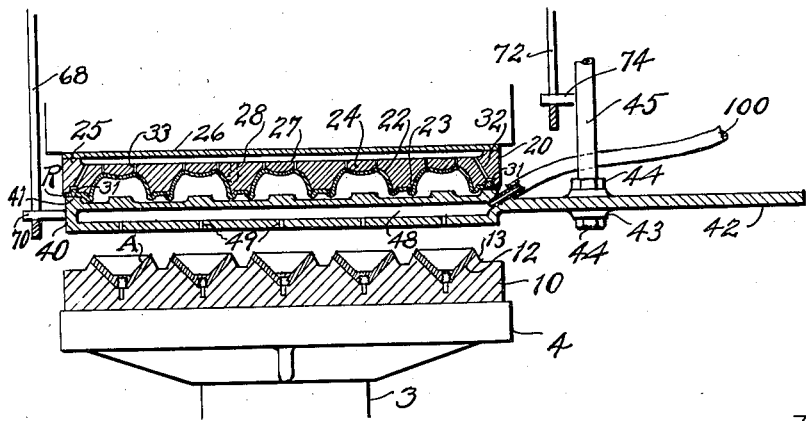

UNITED STATES PATENT OFFICE.

FRED THOMAS ROBERTS, OF CLEVELAND, OHIO, ASSIGNOR, BY MESNE ASSIGNMENTS, TO PARAMOUNT RUBBER CONSOLIDATED, INC., OF PHILADELPHIA, PENNSYLVANIA, A CORPORATION OF DELAWARE.

APPARATUS FOR MAKING HOLLOW RUBBER ARTICLES.

1,388,125.

Specification of Letters Patent. Patented Aug. 16, 1921.

Application filed August 5, 1918. Serial No. 248,280.

*To all whom it may concern:*

Be it known that I, FRED THOMAS ROBERTS, a citizen of the United States, residing at Cleveland, in the county of Cuyahoga and State of Ohio, have invented a certain new and useful Improvement in Apparatus for Making Hollow Rubber Articles, of which the following is a full, clear, and exact description, reference being had to the accompanying drawings.

This invention relates particularly to the manufacture of hollow rubber articles, and a primary object is to supply a simple, efficient apparatus for the manufacture of such articles in quantities. In such an apparatus I use a pair of mold members each having several mold cavities and I provide means for causing sheet stock to extend over the several cavities and be pneumatically seated in the cavities. Such mold members are carried in a suitable press adapted to forcibly bring them together to unite the stock in the cavities at the edges. A more particular object of this invention is to provide a simple and inexpensive means for presenting sheet stock to the mold, whereby a single sheet may extend over all the cavities and be simultaneously seated therein by pneumatic pressure. Still another object is to so arrange such means that it may be readily adapted to any hydraulic press carrying the molds and at the same time be capable of convenient operation. Still another object is to so construct this mechanism that it may quickly and evenly present the sheet to all the cavities simultaneously. The above and other objects will become more apparent from the following description which refers to the drawings illustrating a convenient embodiment of the present invention, as adapted for the manufacture of valve balls having a flexible lower seat fitting portion and a stiffened upper portion to permanently retain the shape of the ball. The essential characteristics of this invention are summarized in the claims.

Figure 1:
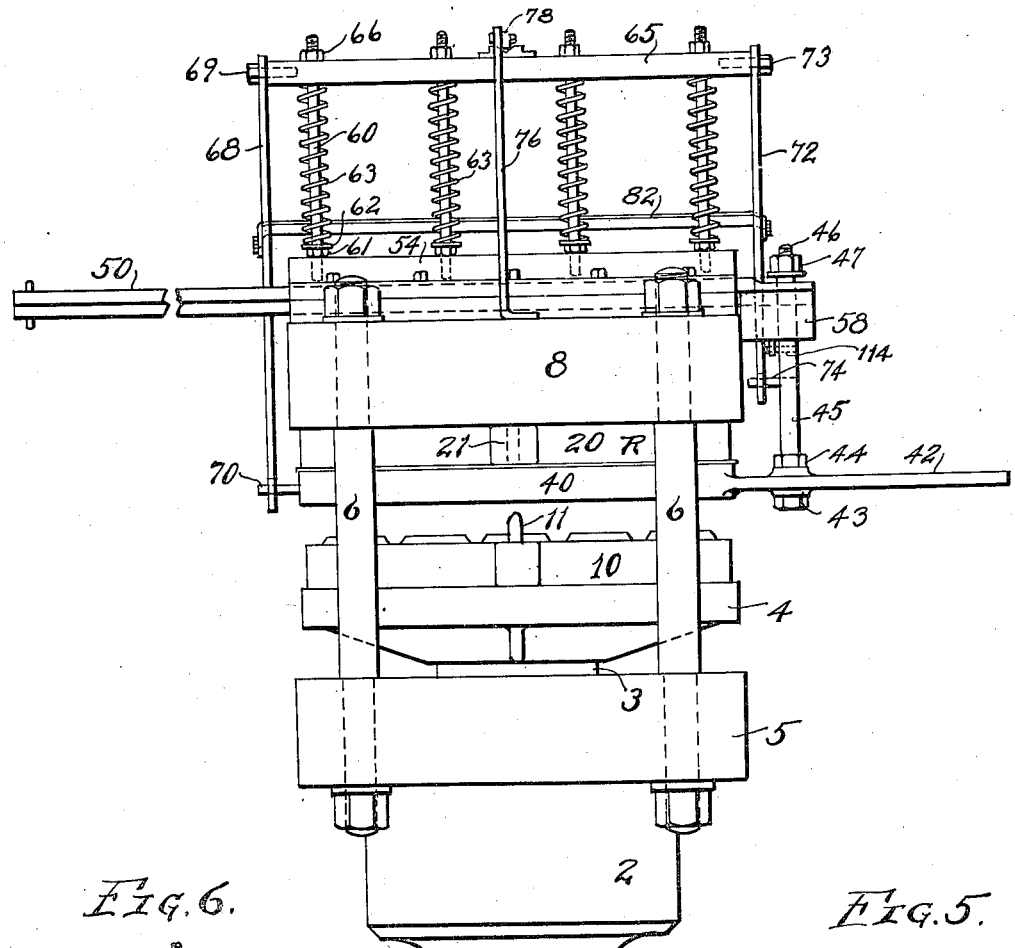
Figure 6:
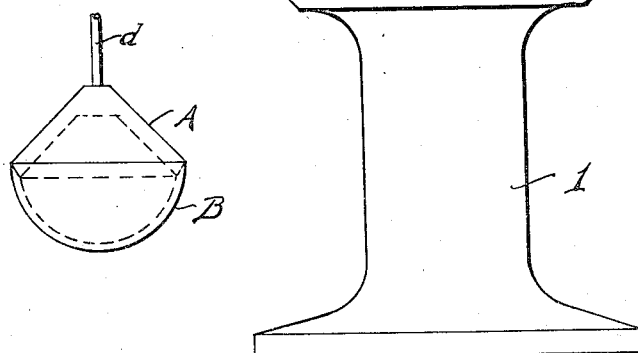
Figure 5:
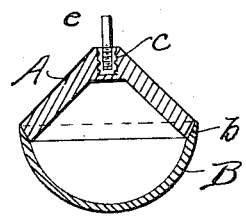

In the drawings, Figure 1 is a side elevation of a mold press equipped with this invention; Fig. 2 is a similar elevation taken at right angles to Fig. 1; Fig. 3 is a plan of the same, showing the stock carrying member substantially in its receiving position withdrawn from the press; Fig. 4 is in the nature of a vertical section on a plane substantially parallel with Fig. 1 showing the construction of the molds, and stock carrying member and illustrating the stock in position; Fig. 5 is a vertical section on a somewhat enlarged scale through a valve ball made by this apparatus; Fig. 6 is an elevation of the completed article.

Describing the parts by the use of reference characters, 1 indicates a suitable standard-like supporting base for a hydraulic press and having an integral enlarged portion 2 forming a cylinder for the press plunger 3 carrying the usual platen 4. A still further enlargement of the support indicated at 5 provides suitable securing means for vertical supporting rods 6 rising from the member 5 and extending through and secured to the stationary platen 8. The movable platen 4 carries a mold member 10 which is provided with a plurality of mold cavities adapted to register with coacting cavities in a mold plate 20 carried by the stationary platen 8. The cavities of the molds 10 and 20 are caused to register by dowel pins 11 mounted on suitable outstanding ears on one of the mold plates, as for example the plate 10, and adapted to enter and fit openings 21 formed in suitable lateral projections on the mold plate 20.

In the making of the article shown the upper part of the article A is previously formed in other mold members (such for example as shown and described in my prior application No. 190,383, filed Sept. 8, 1917) and then partially cured, whereby it may retain its shape, and in the forming of this upper half a ferrule $c$ is set into the rubber and permanently vulcanized thereto for receiving the threaded lower end of a rod by which the valve ball is lifted from its seat when in use. The lower and more flexible half of the article B is formed from a sheet of raw rubber drawn into the cavities of the mold member 20 and caused to unite with the member A along a beveled seam $b$. When the part A is formed the ferrule $c$ is fitted with a short threaded peg $e$ which may position it while the rubber is being forced to embrace the ferrule in the forming mold.

Referring to Fig. 4 the mold member 10 is shown as provided with a series of inverted cavities substantially cone-shaped and adapted to receive the previously formed members A, there being an opening in each cavity to receive the peg e. These cone-shaped cavities are indicated at 12 and are each surrounded by a knife edge 13 adapted to coact with a similar knife edge 23 around the mold cavities 22 of the mold plate 20. The mold cavities 21 are provided with a hump 24 whereby when a sheet stock R is drawn into these cavities more even thickness of the wall of the article formed in such cavities may be maintained, as described and claimed in my prior application, No. 154,072, filed March 12, 1917.

The mold plate 20 as shown is provided with a rib 25 fitted in an air-tight manner to a plate 26 providing a cavity or chamber 27 connected through a passage 28 with a pipe 29 under the control of a valve 30 and leading to a means for producing a vacuum. Around the outside of the cavities 22 and adjacent the perimeter of the plate 20 is a groove 31 connected by passages 32 with the chamber 26, whereby the edge of the rubber sheet is tightly drawn into this groove, and in effect pneumatically clamped while the stock is subsequently forced into the cavities by the application of vacuum through passages 33.

These mold plates as shown are merely illustrative of the use of the present invention.

Referring next to the device (with which this invention is particularly concerned) for conveniently presenting a sheet of raw rubber stock to the mold plate 20, I have shown a carrier plate 40 having on its upper surface a rib 41 around the perimeter thereof and adapted to press the edge of the sheet stock to the grooves 31, insuring the stock being pneumatically seated and clamped by such grooves. This plate is shown as having an integral extension 42 adapted to project laterally from the press when this plate is in the position shown in Figs. 1, 2 and 4. On the extension 42 are bosses 43 through which an opening is provided adapted to receive the lower end of a supporting rod 45 threaded to receive nuts 44 rigidly clamping the rod to the extension plate 42. The rod 45 has a reduced extension 46 receiving a nut and washer at 47 to carry the weight of the rod 45 and plate 40. The supporting bar 50 is shown as slidable through a transverse guideway mounted on the top of the stationary platen 8. This guideway preferably comprises a base member 51 having a V-shaped groove therein to receive the lower half of the square bar 50 fitting this groove on two sides, as shown particularly in Fig. 2, while a coacting guide member 54 fits the other two surfaces of this bar and is provided with flanges 55 secured by suitable screws to the base member 51. Such screws are indicated at 56 and preferably extend through the member 51 and engage the plate 8. A bearing block 58 for the rod 45 is secured to the under side of the supporting bar 50 and acts as a brace to securely hold the bar 45 in its vertical position while permitting it to rotate as the plate 40 is swung about the axis of this rod.

Rising from the guide member 54 and secured therein are shown guide rods 60 threaded into the member 54 and there rigidly clamped by nuts 61 above which are washers 62 receiving the ends of springs 63 which press upwardly against a transverse bar 65 slidably fitted over the rods 60. The bar 65 is limited in its upward movement by nuts 66 threaded onto the upper ends of the rods 60. At one end of the bar 65 I may provide a swinging hook 68 pivotally secured to the bar by a screw 69 and extending downwardly and inwardly and adapted to embrace a pin 70 rigid with the plate 40 and positioned at or near the center of one side of this plate. The transverse center line of the plate extends through the rod 45 and actual center of the plate and through the pin 70, whereby a similar hook 72, pivotally secured by a screw 73 to the other end of the bar 65, may embrace a pin 74, extending inwardly from the rod 45, to support the plate and evenly present the same to the mold member 20 with substantially uniform pressure throughout the meeting surfaces of the members 20 and 40.

Rising from the platen 8 is an arm 76 rigidly secured to the plate and pivotally connected at 77 with a lever 78 extending across a raised V-block 79 on the bar 65 and provided at 80 with a suitable handle. The two hook members 68 and 72 are shown as connected by a transverse bail 82 whereby they may be simultaneously swung to and away from the pins 70 and 74 respectively.

At 90 is shown a pipe leading to the hydraulic cylinder for actuating the ram or plunger 3 by liquid under pressure. Two pipes, 91 and 92, are connected with the pipe 90, the first carrying water under comparatively low pressure, for example, the usual city pressure admitted to the pipe 90 under the control of a hand valve 94 and a check valve 93, while a valve adapted for high pressure indicated at 95 controls the pipe 92, through which water may be admitted to the cylinder under very high pressure. A drain valve 96 when opened exhausts the cylinder and lowers the ram.

A more complete description of the operation of my device is as follows: The semi-cured previously formed parts A are placed in the inverted cone-shaped cavities 12 of the mold member 10 and a sheet of raw rubber stock indicated at R is placed onto the upper surface of the plate 40, when such plate is approximately in the position indicated in Fig. 3 where it may be readily accessible for this purpose. The plate 40 is then swung inwardly to the position indicated in dot and dash lines at 40ª, Fig. 3, and then the plate is moved inwardly between the mold members, the first of these movements being accomplished by swinging the plate 40 about the axis of the rod 45 and the second inward movement being accomplished by sliding the bar 50 longitudinally through its guide. The lever 80 is then grasped by hand to depress the bar 65 against the action of the springs 60 and the hooks are simultaneously swung inwardly to engage the pins 70 and 74, this swinging movement being readily accomplished by grasping the bail 82 with one hand, while depressing the lever 78 with the other. The releasing of this lever then permits the action of the springs to cause the hooks to engage their pins and move the plate 40 upwardly to present the sheet R to the mold plate 20, as described. The vertical movement of the plate 40 relative to its supporting bar 50 is permitted by reason of the sliding of the bar 45 through the block 58 and bar 50.

While the plate 40 is thus pressed to the mold 20, the valve 30 is operated to apply the vacuum to the plate 20 with the result that the rubber is drawn into the grooves 31 and into the cavities 22, as illustrated in Fig. 4. Air is admitted beneath the sheet R by grooves 110, while bosses 112 support the sheet in such manner as to present it effectively to the mold and at the same time prevent it adhering to the carrier plate. The bar 65 may then be depressed and the hooks withdrawn, whereupon the plate 40 is allowed to move downwardly by gravity until supported by the washer and nut 47, in which position it is just below the rubber stock on the mold plate 20 and may be readily withdrawn from between the mold members by longitudinal movement of the bar 50 from the position shown in Fig. 1 to the position shown in Fig. 3 where the plate 40 may again swing outwardly from beneath the bar 50 and away from the press frame if desired. It will be noted that the bar 50 is made angular and of sufficient strength to support the weight of the plate 40 at either side of the bar as well as when this weight is practically beneath the same.

Having thus presented the rubber sheet to the upper mold member, the lower mold carrying its previously formed parts is then moved upwardly to the upper mold by hydraulic pressure, the major portion of the movement being accomplished by actuating the valve 94 to admit water at the ordinary city pressure which is sufficient to raise the mold while the final forcible movement is accomplished by opening the valve 95 to admit water at a very high pressure. Bringing the molds together forcibly unites the parts of the articles at the meeting edges and severs them from the surrounding stock.

It will be seen that the plate 40 may be of any suitable construction to present the rubber sheet to the mold 20, but I have found it more adaptable for various uses to make this plate hollow. For example, I may admit water to this chamber through a tubular connection 100 and distribute it through openings 49 to the parts of the article in the lower mold member and thus provide an expansible material for the necessary internal pressure during vulcanization.

The movement of the carrier plate to the position between the molds may be facilitated by making the block 58 of such length that it forms a stop to limit the inward sliding movement and accurately position this carrier. Coöperating stops may be used to limit the swinging movement of the carrier plate to insure alinement before the inward sliding movement is started. Accordingly I have shown a pin 114 carried by the rod 45 and adapted to engage a projection on the lower side of the block 58.

Having thus described my invention what I claim is:—

1. In an apparatus for making hollow rubber articles, the combination of a press, coacting mold members carried thereon, a carrier for bringing rubber to be acted upon to the mold, and movable to and from the space between said members, said carrier including a slide and means for supporting said carrier at each side of the press.

2. In an apparatus for making hollow rubber articles, the combination of mold members, a carrier movable to and from the space between the mold members for bringing rubber to be acted upon to the molds, means for supporting said carrier at each side of the press, and means acting upon the supporting means to raise or lower the carrier toward or away from the mold.

3. In an apparatus of the character described, the combination of a mold press, mold members carried thereby, a table adapted to be moved from a position outside the press to a position between the molds of the press, and means for supporting the table including an upright supporting member about which the table may swing.

4. In an apparatus for making hollow rubber articles, the combination of a mold press, coacting mold members carried thereby, a carrier for bringing rubber stock to be acted upon to the molds, and movable to and from a position between the molds, and means for engaging the carrier at opposite sides for moving the carrier vertically to present it to one of the molds.

5. In an apparatus of the character described, the combination of a mold press, mold members carried thereby, a table, means supporting the table and adapted to permit the same to be moved from a position outside the press to a position between the molds of the press, and yielding means for engaging the table at opposite sides to vertically move the table and present the stock thereon to a mold member.

6. In an apparatus for making hollow rubber articles, the combination of a mold member, a carrier for bringing rubber to be acted upon to the mold, a slide supporting the carrier, a connection between the slide and carrier adapted to permit the swinging of the carrier, whereby it may move in a path transversely of the mold and be swung out of such path.

7. In an apparatus for making hollow rubber articles, the combination of a mold member, a carrier for bringing rubber to be acted upon to the mold, a slide supporting the carrier, a depressible mechanism adapted to engage the carrier at opposite sides of the mold and present the carrier to the mold with an even pressure.

8. In an apparatus of the character described, the combination of a mold member, of a press carrying said member, a carrier for bringing material to be acted upon to the mold, means for supporting the carrier and adapted to permit the swinging of the carrier to or from registering position with the mold.

9. In an apparatus of the character described, the combination of a mold member, of a press carrying said member, a carrier for bringing material to be acted upon to the mold, means for supporting the carrier and adapted to permit the movement of the carrier to or from a position in presentation to the mold, means for engaging the carrier at opposite sides of the mold, including yielding means exerting substantially equal pressure at such sides to present the carrier to the mold.

10. In an apparatus of the character described, the combination of a mold member, of a press carrying said member, a carrier for bringing material to be acted upon to the mold, means for supporting the carrier and adapted to permit the movement of the carrier to or from a position in alinement with the mold, and detachable means for engaging the carrier at opposite sides of the mold to present the carrier to the mold.

11. In an apparatus for making hollow rubber articles, the combination of a press, a mold carried thereby, means for bringing material to be acted upon to the mold including a carrier table, a slide, guideway for the slide mounted on the mold, and a pivotal connection between the carrier and the slide.

12. In an apparatus for making hollow rubber articles, the combination with a press, a mold carried by the press, means for presenting rubber stock to the mold comprising a carrier plate, a guideway for the slide mounted on the mold, a transverse bar above the mold, depending members adapted to engage the carrier at each side of the mold, and yielding means for urging the bar upwardly to raise the carrier to the mold.

13. In an apparatus for making hollow rubber articles, the combination with a press, a mold carried by the press, means for presenting rubber stock to the mold comprising a carrier plate, a slide supporting said plate, a guideway for the slide mounted on the mold, a transverse bar above the mold, depending hook members carried by the bar and adapted to engage the carrier at each side of the mold, yielding means for urging the bar and hooks upwardly to raise the carrier of the mold, and means for depressing the bar and hooks.

14. In an apparatus of the character described, the combination of a separable mold, of a press carrying said mold, a hollow carrier adapted to move into the space between the mold members, the carrier having openings positioned to register with cavities in one of the mold members, and means for conveying liquid to the carrier.

15. In an apparatus of the character described, the combination of a mold having a plurality of cavities, a carrier for bringing rubber stock and liquid to the cavities, comprising a chamber member adapted to carry the stock on a surface and having openings arranged to discharge into the several cavities, and means for controlling such discharge.

16. In an apparatus for making hollow rubber articles, the combination of a separable mold, a carrier for bringing rubber to be acted upon to the mold, a slide supporting the carrier and adapted to permit movement of the carrier to and from a position between the molds while allowing vertical movement of the carrier.

17. In an apparatus for making rubber articles, the combination of a mold having a cavity and a groove outside of the cavity, a carrier adapted to present rubber to the mold and groove and having a rib opposite the groove and means for exhausting the groove.

18. In an apparatus of the character described, the combination of a mold member having a cavity, a groove in the member extending entirely about the cavity, means for exhausting the air from the cavity and groove, a carrier plate adapted to present a rubber sheet to the mold, said carrier plate having a projecting border portion adapted to effectively seat the rubber sheet across the groove.

In testimony whereof I hereunto affix my signature.

FRED THOMAS ROBERTS.